Figure 1:
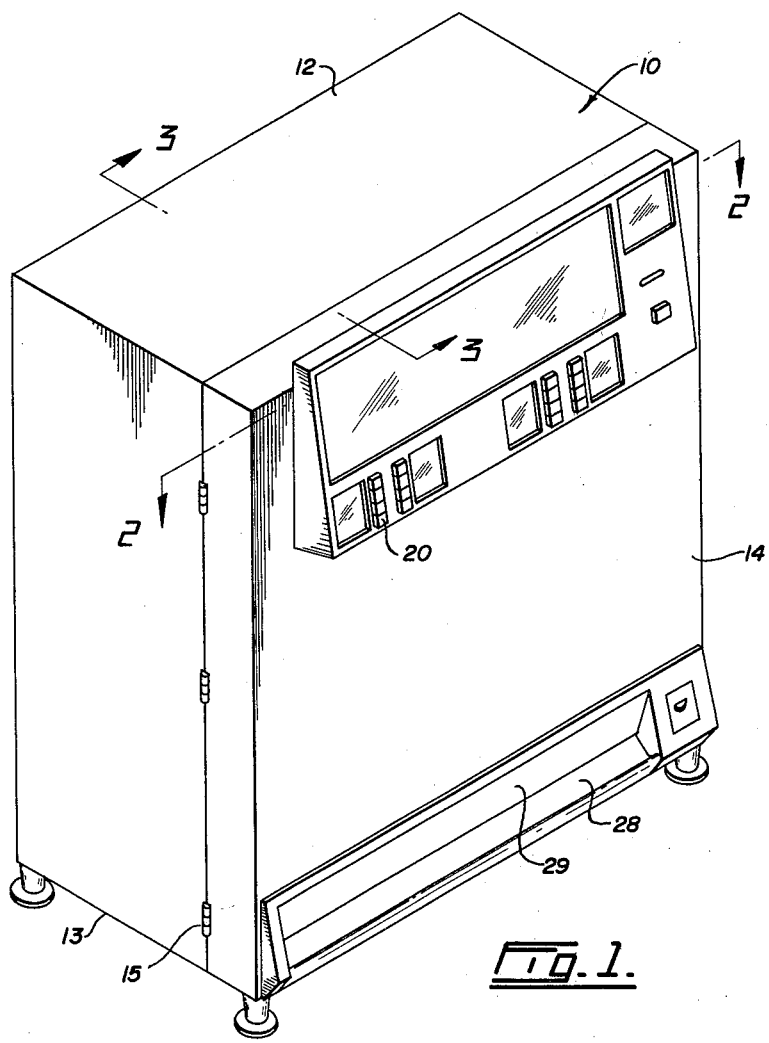

Dec. 1, 1964   C. G. STEPHENSON ETAL   3,159,307
PHONOGRAPH RECORD DISPENSING APPARATUS
Filed March 11, 1963   7 Sheets-Sheet 1

INVENTORS
CARL G. STEPHENSON
CLAUDE L. CROCKER
EARL BISMEYER
BY
Featherstonhaugh & Co.
ATTORNEYS Dec. 1, 1964　　C. G. STEPHENSON ETAL　　3,159,307
PHONOGRAPH RECORD DISPENSING APPARATUS
Filed March 11, 1963　　　　　　　　　　　　　　7 Sheets-Sheet 2
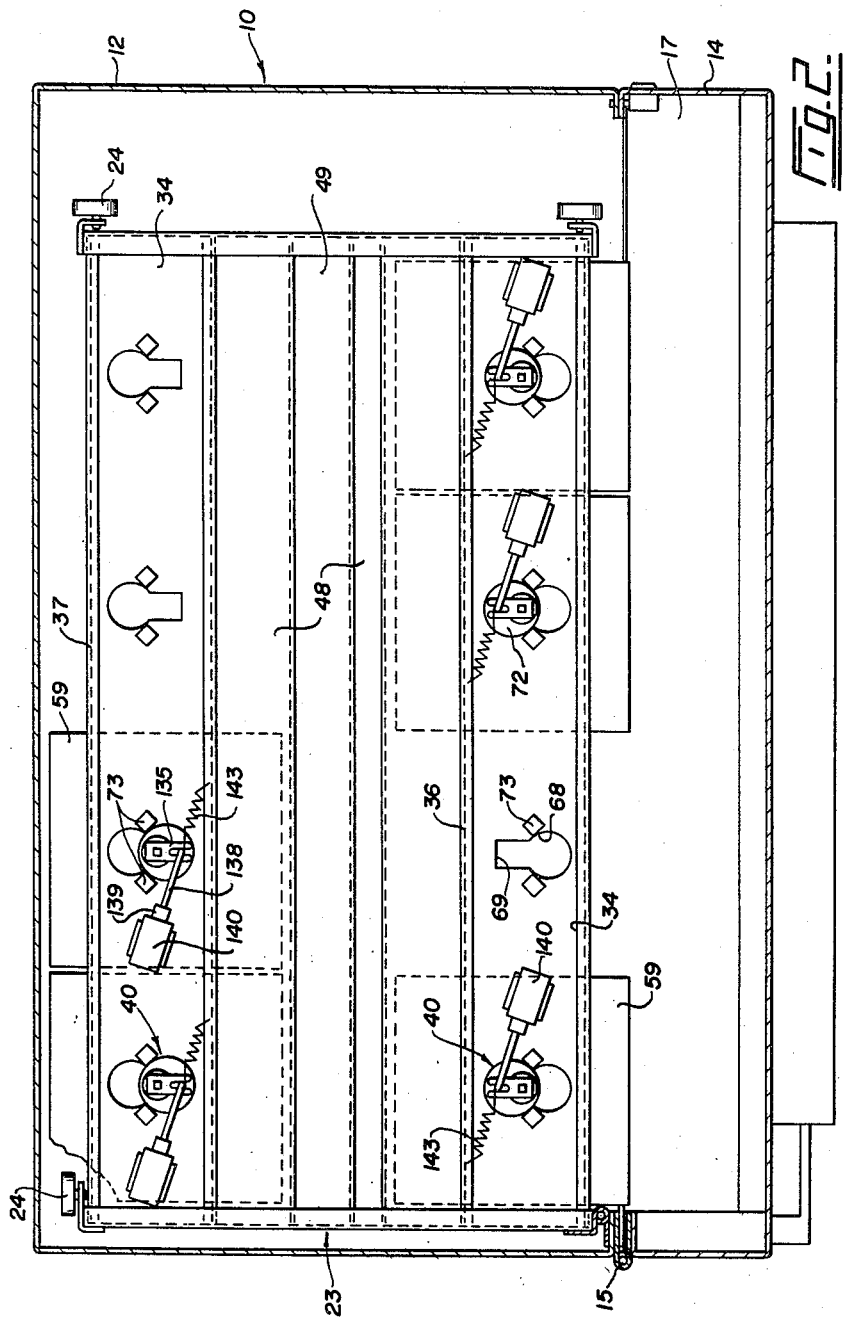
INVENTORS
CARL G. STEPHENSON
CLAUDE L. CROCKER
EARL BISMEYER
BY
Fetherstonhaugh & Co.
ATTORNEYS

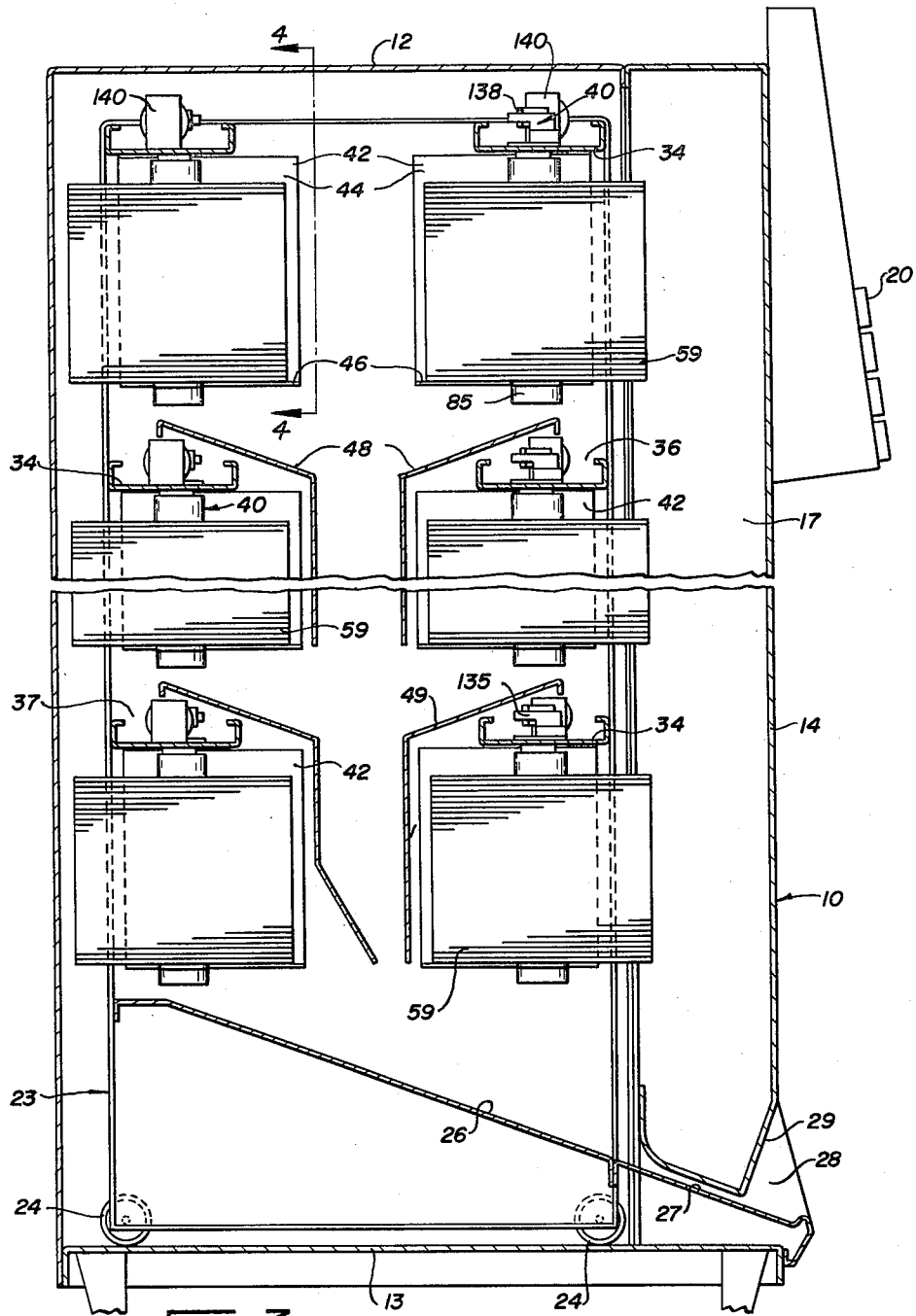

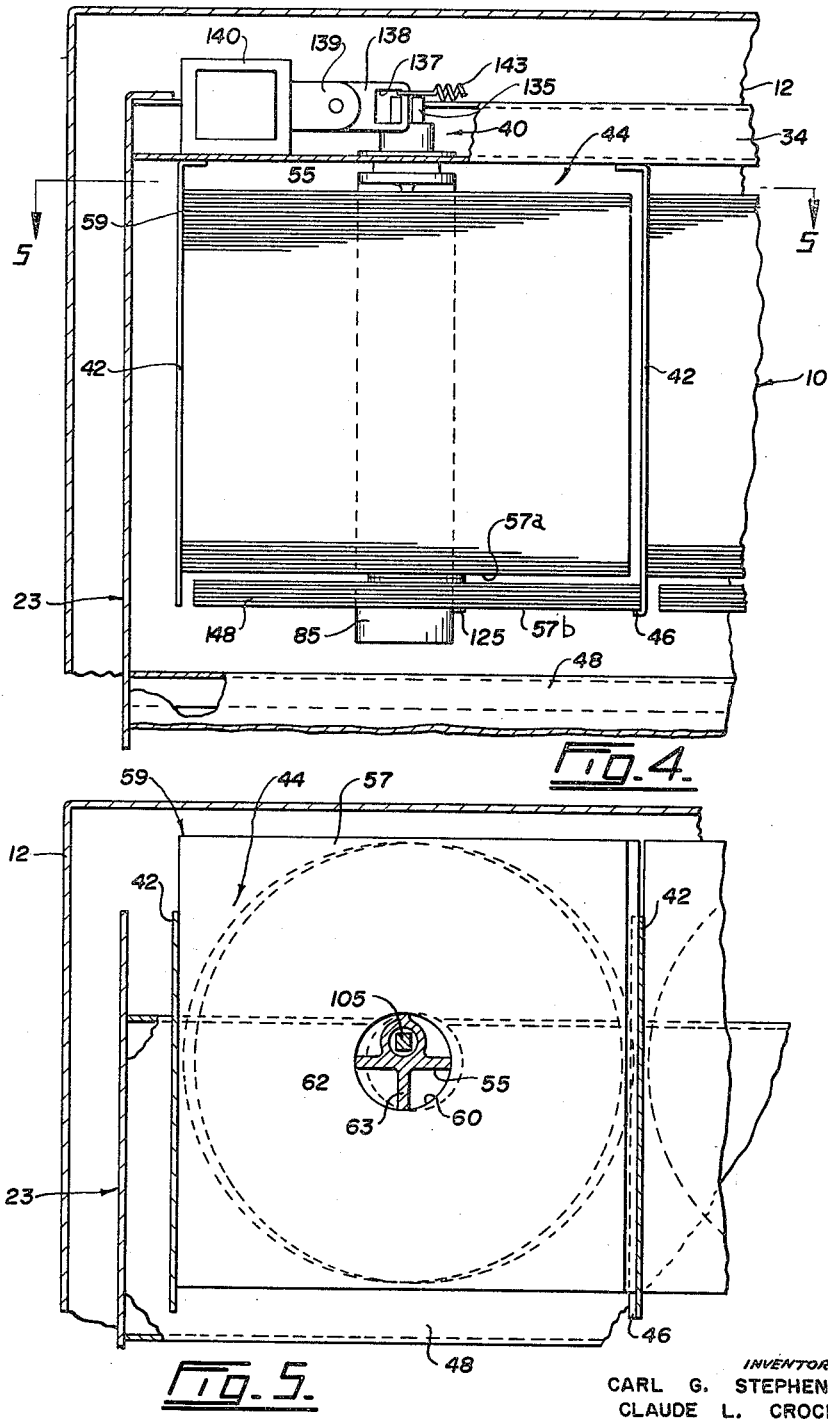

Dec. 1, 1964   C. G. STEPHENSON ETAL   3,159,307
PHONOGRAPH RECORD DISPENSING APPARATUS
Filed March 11, 1963   7 Sheets-Sheet 5
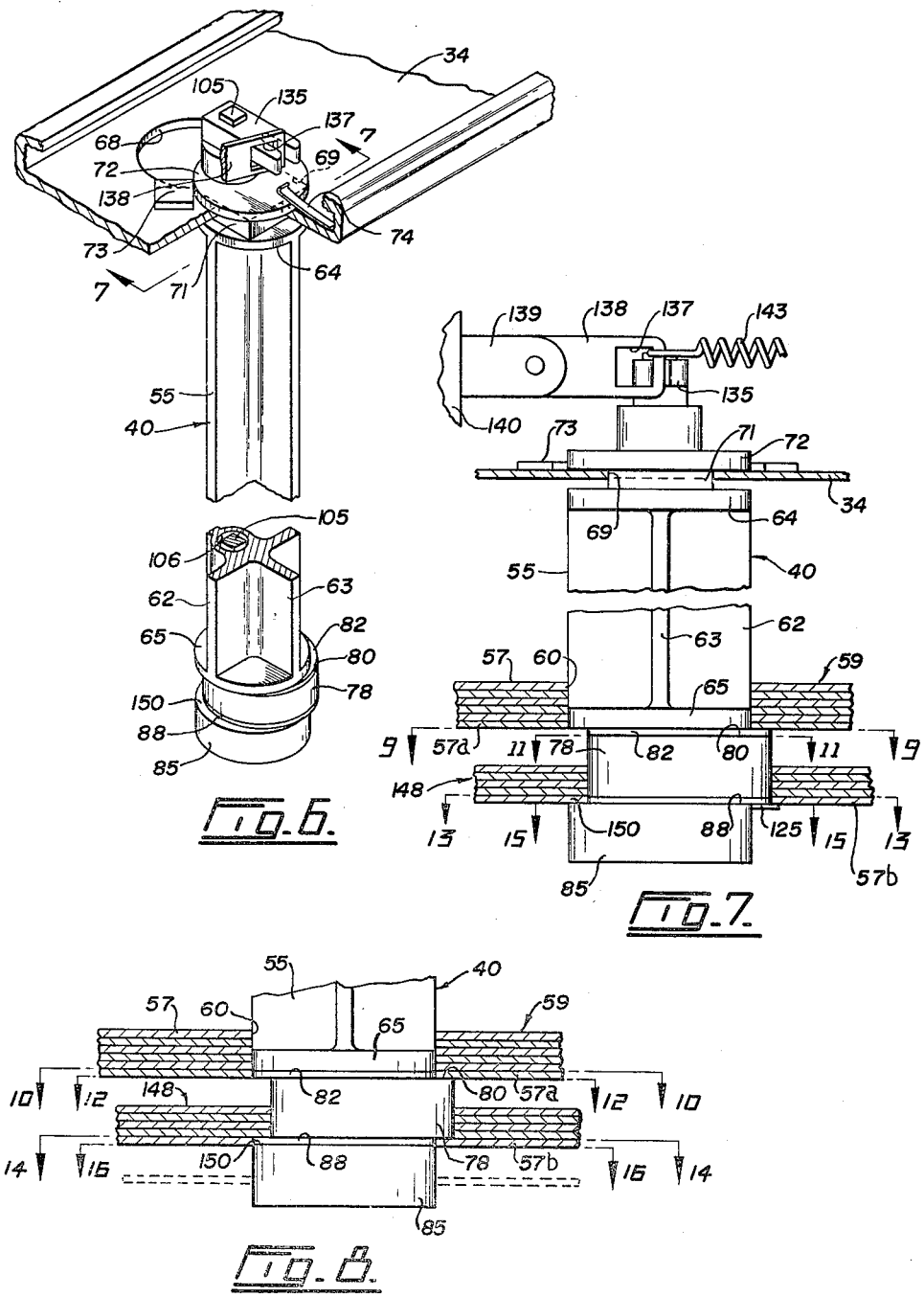
INVENTORS
CARL G. STEPHENSON
CLAUDE L. CROCKER
EARL BISMEYER
BY
Fetherstonhaugh & Co.
ATTORNEYS

INVENTORS
CARL G. STEPHENSON
CLAUDE L. CROCKER
EARL BISMEYER

Dec. 1, 1964   C. G. STEPHENSON ETAL   3,159,307
PHONOGRAPH RECORD DISPENSING APPARATUS
Filed March 11, 1963   7 Sheets-Sheet 7
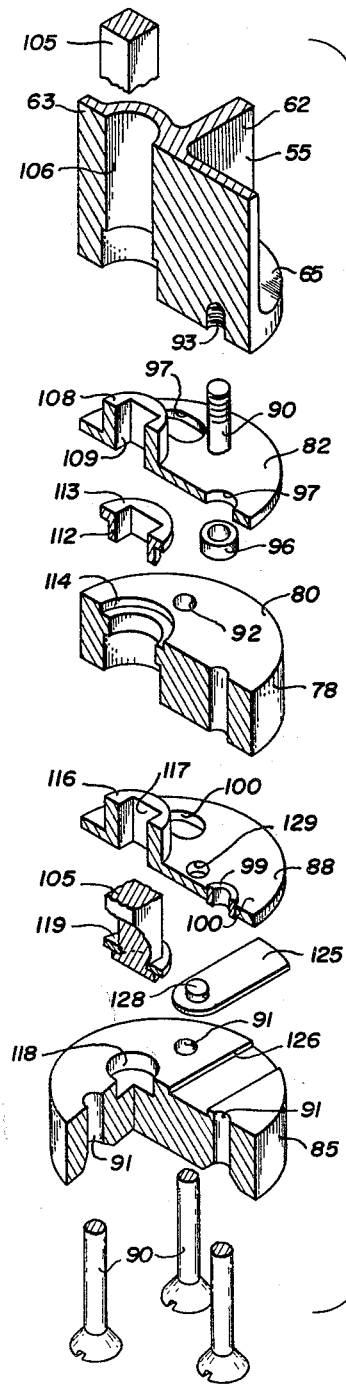
INVENTORS
CARL G. STEPHENSON
CLAUDE L. CROCKER
EARL BISMEYER United States Patent Office 3,159,307
Patented Dec. 1, 1964

3,159,307
PHONOGRAPH RECORD DISPENSING
APPARATUS
Carl G. Stephenson, Vancouver, British Columbia, Claude L. Crocker, South Burnaby, British Columbia, and Earl Bismeyer, Vancouver, British Columbia, Canada, assignors to Record King Sales Ltd., Vancouver, British Columbia, Canada, a corporation of British Columbia
Filed Mar. 11, 1963, Ser. No. 264,346
14 Claims. (Cl. 221—129)

This invention relates to apparatus for dispensing flat articles, such as phonograph records, that have holes through the centres thereof.

While this apparatus is primarily designed for dispensing phonograph records, and it is described relative to such records, it may be used to dispense any flat articles having holes through the centres thereof.

This machine is intended to be a coin-operated dispenser for records, but the coin-operated mechanism may be omitted, in which case, the machine would be primarily for storing large numbers of different records in such a way that any desired record may be obtained merely pressing one of a number of buttons.

There are coin-operated machines for dispensing many different types of articles, such as cigarettes, candy bars, sandwiches, and the like, but there does not seem to be any successful machine for dispensing phonograph records. The difficulty is that phonograph records are very thin relative to their diameters, they are very light, and they tend to stick together when in a stack. As a result of this, it is difficult to dispense one record at a time without fear of more than one record being made available at a time. Another problem results from the fact that known dispensing mechanisms are so involved and bulky that it is not possible to house a reasonable number of different records in a cabinet of reasonable dimensions.

The present invention overcomes these difficulties by providing a dispensing mechanism that can eject one record at a time from a stack, regardless of the number of records in the stack. Furthermore, most of the dispensing mechanism is located within the stack of records so that a large number of different kinds of records, and a large number of each of these kinds, can be stored in a cabinet of comparatively small size. For example, a cabinet that is approximately 66 inches high, 24 inches deep and 43 inches wide can hold 30 stacks of "45" records with 100 records in each stack. A record from any stack is dispended immediately when a button for controlling that stack is depressed.

Apparatus according to the present invention for dispensing flat articles basically comprises a vertical core upon which a plurality of said articles can be stacked with the core extending through the holes thereof, said core being of a diameter and shape slidably to fit in the article holes, a support at the lower end of the core of a diameter and shape slidably to fit in the article holes and offset relative to the core to form a laterally-projecting shoulder, a shifting element between the core and the support of a diameter and shape slidably to fit in the article holes and movable between positions coinciding with the core and coinciding with the support, and means connected to said element for shifting the latter back and forth between said coinciding positions, the lowermost article of the stack resting on the shifting element when said element coincides with the support, and when the element is successively moved to coincide with the core and then back to coincide with the support, said lowermost article first drops down over the element and on to the shoulder and then is shifted off the shoulder by the element to drop down along the support.

Apparatus for dispensing a number of different records comprises a cabinet, a plurality of horizontal supports mounted in the cabinet, and a plurality of laterally-spaced cores suspended from each support. Power means is mounted on each support and connected to the operating means of each core. The cabinet includes means below the cores for receiving articles therefrom and directing these articles to a discharge opening in the cabinet.

Figure 9:
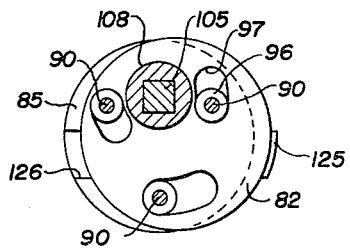
Figure 10:
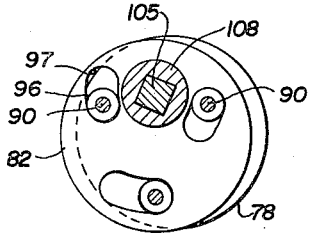
Figure 11:
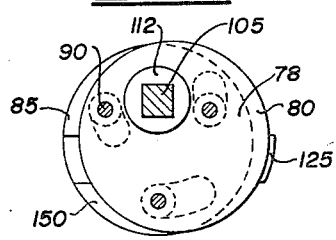
Figure 12:
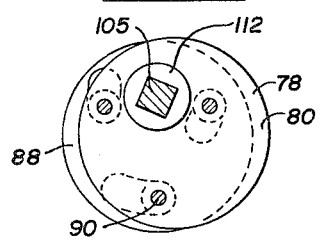
Figure 13:
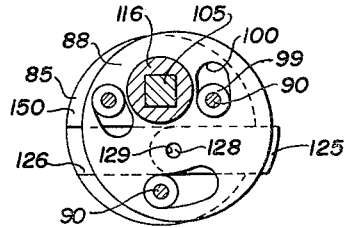
Figure 14:
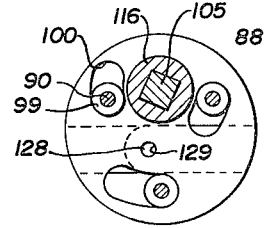
Figure 15:
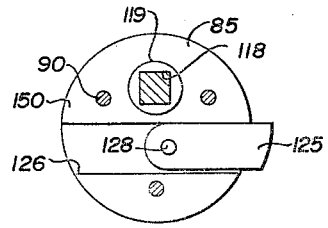
Figure 16:
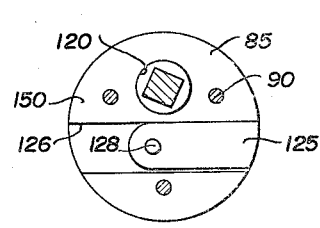

An example of this invention is illustrated in the accompanying drawings, in which, FIGURE 1 is a perspective view of a coin-operated dispensing apparatus, FIGURE 2 is an enlarged horizontal section taken on the line 2—2 of FIGURE 1, FIGURE 3 is an enlarged vertical section taken on the line 3—3 of FIGURE 1, FIGURE 4 is an enlarged side elevation of a single dispensing unit as seen from line 4—4 of FIGURE 3, FIGURE 5 is a horizontal section taken on the line 5—5 of FIGURE 4, FIGURE 6 is an enlarged perspective view of a single dispensing unit with the records removed therefrom, FIGURE 7 is an enlarged vertical section taken on the line 7—7 of FIGURE 6, showing the dispensing unit in side elevation with a few records thereon, FIGURE 8 is a view similar to FIGURE 7 of the lower portion of the dispensing unit which has just been operated to dispense a record, FIGURE 9 is a horizontal section taken on the line 9—9 of FIGURE 7, FIGURE 10 is a horizontal section taken on the line 10—10 of FIGURE 8, FIGURE 11 is a horizontal section taken on the line 11—11 of FIGURE 7, FIGURE 12 is a horizontal section taken on the line 12—12 of FIGURE 8, FIGURE 13 is a horizontal section taken on the line 13—13 of FIGURE 7, FIGURE 14 is a horizontal section taken on the line 14—14 of FIGURE 8, FIGURE 15 is a horizontal section taken on the line 15—15 of FIGURE 7, FIGURE 16 is a horizontal section taken on the line 16—16 of FIGURE 8, and FIGURE 17 is an enlarged exploded perspective view of the lower end of the dispensing unit, showing the various elements in section.

Referring to FIGURES 1 to 4 of the drawings, 10 is a record dispensing apparatus consisting of a cabinet 12 having a bottom 13 and a front panel 14 which is swingably mounted on the cabinet in any suitable manner, such as by means of hinges 15. Panel 14 may be swung open so as completely to uncover the front of the cabinet 12 in order to provide easy access to the interior of the cabinet. Panel 14 is hollow, as indicated at 17 in FIGURE 3, and contains the coin release mechanism, not shown, if such is required. A plurality of buttons 20 mounted on the front of panel 14 are adapted to be depressed in order to dispense records from cabinet 12.

A chassis or frame 23 is mounted on rollers 24 in cabinet 12 and is adapted to be pulled out of said cabinet. An inclined chute 26 is mounted on chassis 23 near the bottom thereof and extends towards panel 14. This panel includes an extension 27 of the chute which extends to a discharge outlet 28 near the bottom of cabinet 12. A deflector 29 extends across outlet 28 immediately above chute extension 27 in order to prevent access to the cabinet at said chute.

A plurality of horizontal supports or trays 34 extend across chassis 23 and are carried thereby. By referring to FIGURES 2 and 3, it will be seen that there are two vertical rows 36 and 37 of three supports 34 in the cabinet. However, there may be any desired number of these rows and any desired number of supports in each row, depending upon the size of the apparatus.

A plurality of identical dispensing units 40 are suspended from each of the supports 34, there being four of these units suspended from each support in the illustrated apparatus. A plurality of laterally-spaced walls 42 depend from each support 34 to form a compartment 44 at each dispensing unit 40. By referring to FIGURES 4 and 5, it will be seen that one of the walls 42 is common to two adjacent compartments 44, and that the lower edge of this wall is bent into one of the compartments to form a narrow ledge 46.

When a record is dispensed or discharged from a unit 40, it drops downwardly therefrom. Therefore, in order to prevent records from dropping on to dispensing units below the units from which they are discharged, a plurality of baffles 48 extend across and are carried by chassis 23 in order to direct the records into a central passage 49 through which they drop on to chute 26, see FIGURE 3.

As all of the dispensing units 40 are identical, one only will now be described in detail. FIGURES 4 to 17 illustrate one of these units.

Dispensing unit 40 includes a core 55 upon which a plurality of records may be placed in a stack 59. Core 55 is of a diameter and shape slidably to fit in the hole 60 of records 57. In this example, the records are what is commonly known as "45" records and, therefore, the holes 60 are relatively large. Core 55 may be in the form of a cylinder, but in order to reduce friction, it is preferable to form the core of elongated crossed members 62 and 63 having discs 64 and 65 at the upper and lower ends thereof.

Core 55 is removably suspended from support 34 in any convenient manner. However, it is desirable to support the core so that it can be quickly and easily removed from the supports in order to allow the records to be placed thereon. In this example, support 34 is formed with a hole 68 therein which is just large enough to permit the core to be moved longitudinally therethrough. A slot 69 radiates from the hole towards the middle of chassis 23, and the core is provided with a squared section 71 at its upper end which slidably fits in said slot. A plate 72 of the same size and shape as the core 55 is secured to the upper surface of section 71, said plate being slidable on support 34, too large to move downwardly through slot 69, but small enough to be moved through hole 68. Locking tabs 73 are fixedly mounted on support 34 on each side of slot 69 near hole 68. With this arrangement, the core has to be raised sufficiently to enable plate 72 to clear tabs 73 when square section 71 is moved into or out of slot 69. A spring 74 is mounted on support 34 and fits over the top of plate 72 frictionally to hold core 55 in place. The square section 71 fitting in slot 69 prevents the core from rotating arounds its longitudinal axis.

A support 78 is connected to the lower end of core 55. This support is of a diameter and shape slidably to fit in the holes 60 of records 57, and it is offset relative to the core to form a laterally-projecting shoulder 80. Actually, support 78 is an extension of core 55 which is offset laterally slightly relative tot he core, as clearly shown in FIGURES 6, 7 and 8. A shifting element 82 is located between core 55 and support 78, and is of a diameter and shape slidably to fit in the hole 60 of records 57. This shifting element is movable between positions coinciding with the lower end of core 55 and coinciding with support 78. For example, in FIGURE 7, the shifting element coincides with support 78, while in FIGURE 8, it coincides with core 55.

Records can be dispensed from the unit 40 described so far, but it is preferable to provide a core extension 85 below support 78 and aligned with core 55. This extension also is of a diameter and shape slidably to fit in the holes 60 of records 57. A second shifting element 88 is located between support 78 and core 85 and is aligned and movable with shifting element 82, and is the same shape as the latter.

FIGURES 9 to 17 illustrate the manner in which support 78 and core extension 85 are secured to each other and to the lower end of core 55. In this example, three bolts 90 extend through holes 91 in extension 85, holes 92 in support 78 and are threaded into holes 93 in the lower end of core 55. These bolts hold the core extension and the support against rotation. Shifting element 82 rotatably rests on the upper surface of support 78, and bolts 90 extend through sleeve 96 located in curved slots 97 formed in element 82. Similarly, the bolts extend through sleeves 99 located in curved slots 100 in shifting elements 88, said elements slidably resting on the upper surface of core extension 85.

Shifting elements 82 and 88 are moved simultaneously in any convenient manner. In this example, a square rod 105 extends downwardly through core 55. This rod is rotatably mounted in a bore 106 extending downwardly through an enlargement of cross member 63 of the core. Rod 105 extends through a boss 108 secured to and projecting upwardly from element 82 to one side of the centre thereof. This boss has a square hole 109 therethrough which is just lare enough to accommodate rod 105, so that rotation of the rod around its longitudinal axis shifts element 82 relative to the bottom of core 55 and the top of support 78. The rod also extends through a bearing 112 having a square hole 113 therethrough, said bearing rotatably fitting in a recess 114 formed in the upper surface of support 78.

Rod 105 also extends through another boss 116 secured to and extending upwardly from shifting element 88, said boss having a square hole 117 therethrough adapted to fit around the rod, said boss being eccentrically located relative to element 88 so that rotation of the rod shifts said element relative ot the bottom of support 78 and the top of core extension 85. The bottom end of the rod rotatably fits into a recess 118 in core extension 85. A split ring 119 is fitted on to said rod immediately above said extension.

A safety latch arrangement is provided at the top of core extension 85. This arrangement includes a latch 125 slidably mounted in a slot 126 formed in the upper surface of extension 85 and extending across this surface. A pin 128 extends upwardly from latch 125 and fits loosely in a hole 129 in shifting element 88. When this element is in a position coinciding with the bottom of support 78, latch 125 projects a little beyond element 88, see FIGURE 7, and towards ledge 46 of an adjacent wall 42, see FIGURE 4. When element 88 is swung into a position coinciding with the top of core extension 85, latch 125 is drawn inwardly of the extension so that it does not project beyond the edge of element 88.

Each rod 105 is rotated back and forth around its longitudinal axis in any desired manner. In this example, an arm 135 is secured to the upper end of rod 105 above plate 72 and extends away from support hole 65 and over slot 69. This arm or a portion of the arm extends through a hole 137 in the end of a link 138 which extends substantially at right angles to said arm, the opposite end of the link being connected to a core 139 of a solenoid 140 mounted on support 34. A spring 143 is connected at one end to the outer end of link 138 and is connected at its opposite end to a portion of support 34 at 144, see FIGURE 2. This spring opposes the core of solenoid 140 so that it pulls the core a short way out of the solenoid when the latter is de-energized, while the core is drawn back into the solenoid against the pull of spring 143 when said solenoid is energized.

Each solenoid 140 is in a circuit controlled by one of the buttons 20 of FIGURE 1. Thus, when a button is depressed, its solenoid is energized to rotate the adjacent rod 105 around its longitudinal axis, thereby moving shifting elements 82 and 88.

The operation of each dispensing element 40 is relatively simple. When a stack 59 of records is on core 55, the lowermost record 57a rests on the portion of element 82 overlying offset shoulder 80 of support 78. This is the normal position of the dispenser, as shown in FIGURE 3. At this time, element 82 coincides with support 78 and is offset relative to core 55. When rod 105 is rotated by solenoid 140, element 82 is moved into a position coinciding with the lower end of core 55 which allows the lowermost record 57a to drop down on to shoulder 80. When solenoid 140 is de-energized, and the electrical circuits are arranged so that this takes place immediately, spring 143 rotates rod 105 to move element 82 back again to coincide with support 78. This shifts record 57 laterally so that it drops down along the support. It will be noted that element 82 is of a thickness no greater than the thickness of a record. As stated above, dispensing apparatus 40 may be such that the record slides down support 78 and off said support to be discharged out of the cabinet 12. However, the weight of the stack of records 59 makes it difficult to get one record off the bottom of the stack every time. Therefore, it is desirable to keep a small stack 148 of records on support 78, see FIGURES 7 and 8. As element 88 normally coincides with support 78, as shown in FIGURE 7, the lowermost record 57b of stack 148 rests on a shoulder 150 formed by the portion of core extension 85 which is offset laterally relative to support 78, said shoulder 150 being diametrically opposed to shoulder 80 of the support. At this time, lower element 88 is located within the hole 60 of lowermost record 57b. When rod 105 is rotated, as mentioned above, element 88 moves to coincide with core extension 85, shifting record 57b at the same time so that the hole of the latter is aligned with the core extension and the record can drop down relative to said extension. This record drops off the extension and is directed downwardly through central passage 49 on to chute 26 and thence to the discharge outlet 28 of cabinet 12. When element 88 returns to its normal position, the second last record of stack 148 drops downwardly over said element and on to shoulder 150 of core extension 85. As there is not much weight on lowermost record 57b, it is not difficult to shift it off the shoulder of extension 85.

By referring to FIGURE 4, it will be seen that the lowermost record 57b of stack 148 normally rests on protruding latch 125. The outer edge of this record also rests on ledge 46 of adjacent wall 42. This keeps stack 148 stable in its upright position and prevents the lowermost record from discharging accidentally or being shaken from core extension 85, by vibration of the machine. As the lower shifting element 88 is being moved to shift record 57b so that it can slide down extension 85, latch 125 is drawn into said extension so that the record is free to drop, and when element 88 is returned to its normal position, the latch is returned to its protruding position to lock the next record in place.

When it is desired to replenish the records on the dispensing units 40, panel 14 is swung open, and chassis 23 drawn out of cabinet 12. Then the unit 40 to be loaded is shifted into line with the adjacent support hole 68, arm 135 drawing out of link hole 137 at this time, and plate 72 of core 55 is drawn downwardly through said support hole. Thus, the records on any or all of the dispensing units 40 can be quickly and easily changed or replenished. The mechanism for dispensing the records of each stack is contained mainly in the core supporting said stack, and the core is within the stack so that this mechanism requires very little space beyond the stack itself. Thus, a large number of different records can be stored in comparatively little space while the records are readily available when required.

What we claim as our invention is:

1. Apparatus for dispensing flat articles having holes through the centres thereof, comprising a vertical core upon which a plurality of said articles can be stacked with the core extending through the holes thereof, a support at the lower end of the core offset relative to said core to form a laterally-projecting shoulder on said support, a core extension below the support and aligned with the core, and first and second aligned shifting elements respectively between the support and the core and the support and the extension and movable between positions coinciding with the core and extension and coinciding with the support, the offset of the support forming a shoulder on the extension spaced from the support shoulder; said core, support, core extension and first and second shifting elements being of a diameter and shape slidably to fit in the article holes; and means connected to the first and second elements for shifting said elements together back and forth between said coinciding positions, the lowermost article of the stack normally resting on the first shifting element when the elements coincide with the support and at the same time a second article on the support rests on the extension shoulder, and when the first and second elements are successively and simultaneously moved to coincide with the core and extension and then back to coincide with the support said lowermost article drops on to the support shoulder over the first element and said second article is shifted off the extension shoulder by the second element to drop down the extension and then said lowermost article is shifted off the support shoulder by the first element to drop down the support towards the extension shoulder.

2. Dispensing apparatus as claimed in claim 1 in which each of the first and second shifting elements is of a thickness no greater than the thickness of one of said articles.

3. Dispensing apparatus as claimed in claim 1 in which the means for simultaneously shifting the first and second elements back and forth comprises a rotatable rod extending down through the core and the support and connected at its lower end to both of said elements, and means connected to the upper end of the rod for rotating said rod about the axis thereof.

4. Dispensing apparatus as claimed in claim 3 in which the means connected to the upper end of the rod comprises an arm radiating from the rod, and a solenoid operatively connected to said arm.

5. Dispensing apparatus as claimed in claim 1 including a horizontal latch slidably mounted at the core extension spaced from and horizontally aligned with the shoulder thereof, said latch projecting laterally beyond the support when said second element coincides with said support and being movable with said element when the latter moves to coincide with the core extension, at which time said latch does not project beyond the support.

6. Dispensing apparatus as claimed in claim 1 including a horizontal latch slidably mounted on an upper end of the core extension spaced from and horizontally aligned with the shoulder thereof, said latch being movable between an extended position projecting laterally beyond the support and a retracted position not projecting beyond said support, and means connecting the latch to said second element to cause the latch to move therewith, said latch being in the extended position when the second element coincides with the support and in the retracted position when the second element coincides with the core extension.

7. Apparatus for dispensing flat articles having holes through the centres thereof, comprising a horizontal support having a hole therein with a slot radiating from said hole, a vertical core adapted to be suspended from said support and upon which a plurality of articles can be stacked with the core extending through the holes thereof, said core being of a diameter and shape slidably to fit in the article holes, a plate larger across than the core and secured to an upper end thereof, said plate being too large to pass through said slot but small enough to pass through said hole, a squared section on the core beneath the plate adapted to fit in said slot, said core hanging from the plate resting on the horizontal support when the squared section is in the slot and said core being removable from the horizontal support when said core is shifted into said hole, a support at the lower end of the core of a diameter and shape slidably to fit in the article holes and offset relative to the core to form a laterally-projecting shoulder, a shifting element between the core and the support of a diameter and shape slidably to fit in the article holes and movable between positions coinciding with the core and coinciding with the support, operating means extending longitudinally of the core and connected to said element for shifting the latter back and forth between said coinciding positions, and power means mounted on the support connected to said operating means to cause the latter to move said element back and forth, the lowermost article of the stack resting on the shifting element when said element coincides with the support, and when the element is successively moved to coincide with the core and then back to coincide with the support, said lowermost article first drops down over the element and on to the shoulder and then is shifted off the shoulder by the element to drop down along the support.

8. Dispensing apparatus as claimed in claim 7 in which the means for shifting the element back and forth comprises a rotatable rod extending down through the core and connected at its lower end to the element, and the power means is removably connected by linkage to the upper end of the rod.

9. Dispensing apparatus as claimed in claim 8 in which the linkage comprises an arm connected to the upper end of the rod and extending in a direction away from the support hole and over the slot, and a link extending substantially at right angles to the arm and removably connected at one end thereto, the opposite end of said link being connected to a reciprocal source of power.

10. Apparatus for dispensing flat articles having holes through the centres thereof, comprising a horizontal support, a vertical core suspended from said support and upon which a plurality of articles can be stacked with the core extending through the holes thereof, a support at the lower end of the core offset relative to said core to form a laterally-projecting shoulder on said support, a core extension below the support and aligned with the core, and first and second aligned shifting elements respectively between the support and the core and the support and the extension and movable between positions coinciding with the core and extension and coinciding with the support, the offset of the support forming a shoulder on the extension spaced from the support shoulder; said core, support, core extension and first and second shifting elements being of a diameter and shape slidably to fit in the article holes; operating means extending longitudinally of the core and connected to said first and second elements for shifting said elements together back and forth between said coinciding positions, and power means mounted on the support connected to said operating means to cause the latter to shift the elements back and forth, the lowermost article of the stack normally resting on the first shifting element when the elements coincide with the support and at the same time a second article on the support rests on the extension shoulder, and when the first and second elements are successively and simultaneously moved to coincide with the core and extension and then back to coincide with the support said lowermost article drops on to the support shoulder over the first element and said second article is shifted off the extension shoulder by the second element to drop down the extension and then said lowermost article is shifted off the support shoulder by the first element to drop down the support towards the extension shoulder.

11. Dispensing apparatus as claimed in claim 10 in which the horizontal support is formed with a hole therein through which the core can be moved in an axial direction, and a slot radiating from said hole, and said core has a plate secured to its upper end larger than said slot, and a squared section beneath the plate adapted slidably to fit in said slot, whereby the core hangs from the plate resting on the horizontal support when the squared section is in the slot and said core can be removed from the support by shifting it into the hole.

12. Dispensing apparatus as claimed in claim 11 in which the means for simultaneously shifting the first and second elements back and forth comprises a rotatable rod extending down through the core and the support and connected at its lower end to both of said elements, and the power means is removably connected by linkage to the upper end of the rod.

13. Dispensing apparatus as claimed in claim 12 in which the linkage comprises an arm connected to the upper end of the rod and extending in a direction away from the support hole and over the slot, and a link extending substantially at right angles to the arm and removably connected at one end thereto, the opposite end of said link being connected to a reciprocal source of power.

14. Apparatus for dispensing flat articles having holes through the centres thereof, comprising a cabinet, a plurality of horizontal supports mounted in the cabinet, a plurality of laterally-spaced dispensing units suspended from each support; each dispensing unit comprising a core adapted to have a plurality of articles stacked thereon with the core extending through the holes thereof, a support at the lower end of the core offset relative to said core to form a laterally-projecting shoulder on said support, a core extension below the support and aligned with the core, and first and second aligned shifting elements respectively between the support and the core and the support and the extension and movable between positions coinciding with the core and extension and coinciding with the support, the offset of the support forming a shoulder on the extension spaced from the support shoulders, said core, support, core extension and first and second shifting elements being of a diameter and shape slidably to fit in the article holes, operating means connected to the first and second elements for shifting said elements together back and forth between said coinciding poistions; power means mounted on each support and connected to the operating means of each core to cause said operating means to move the shifting element back and forth, the lowermost article of each core normally resting on the first shifting element when the elements coincide with the support and at the same time a second article on the support rests on the extension shoulder, and when the first and second elements are successively and simultaneously moved to coincide with the core and extension and then back to coincide with the support said lowermost article drops on to the support shoulder over the first element and said second article is shifted off the extension shoulder by the second element to drop down the extension and then said lowermost article is shifted off the support shoulder by the first element to drop down the support towards the extension shoulder, and means below the cores for receiving articles therefrom and directing said articles to a discharge opening in the cabinet.

References Cited in the file of this patent
UNITED STATES PATENTS

| | | |
|---|---|---|
| 2,679,917 | Andres | June 1, 1954 |
| 2,950,920 | Morrison | Aug. 30, 1960 |
| 3,090,521 | Fazekas | May 21, 1963 |